United States Patent [19]
Harrigan et al.

[11] 4,156,150
[45] May 22, 1979

[54] CIRCUIT FOR REGULATING A DC VOLTAGE ON WHICH A LARGE AC VOLTAGE IS SUPERIMPOSED

[75] Inventors: Thomas G. Harrigan, Denville; William E. Jewett, Jr., Basking Ridge, both of N.J.

[73] Assignee: Bell Telephone Laboratories, Incorporated, Murray Hill, N.J.

[21] Appl. No.: 861,111

[22] Filed: Dec. 16, 1977

[51] Int. Cl.² .......................... H02J 3/02; G05F 5/00
[52] U.S. Cl. ........................................ 307/2; 307/56; 179/84 R; 323/9; 323/22 T; 323/32
[58] Field of Search ............... 307/45, 1, 2, 100, 56; 179/84 R, 84 A, 84 T, 77, 70, 51; 363/74, 78, 80, 83; 323/32, 93, 100

[56] References Cited
U.S. PATENT DOCUMENTS

| 3,134,913 | 5/1964 | Pederson | 307/2 |
| 3,748,391 | 7/1973 | Shaffer | 179/84 R |
| 4,015,091 | 3/1977 | Rao | 179/84 R |

OTHER PUBLICATIONS
"Economical Series Regulator Supplies up to 10 Amperes", J. E. Buchanan, C. W. Nelson Electronics, Jan. 24, 1974, p. 90.

Primary Examiner—L. T. Hix
Assistant Examiner—S. D. Schreyer
Attorney, Agent, or Firm—Henry T. Brendzel; Robert O. Nimtz

[57] ABSTRACT

Disclosed is a ringing power supply for developing a ringing signal having an AC voltage combined with a regulated DC voltage, of magnitude smaller than the magnitude of the AC voltage, from a source having the AC signal combined with an unregulated DC voltage. The ringing power supply comprises a control circuit responsive to the AC and DC voltages of the source for developing a replica signal of the regulated DC voltage with its superimposed AC voltage, and a regulator responsive to the developed replica signal and to the source for providing the desired ringing signal.

7 Claims, 5 Drawing Figures

CIRCUIT FOR REGULATING A DC VOLTAGE ON WHICH A LARGE AC VOLTAGE IS SUPERIMPOSED

BACKGROUND OF THE INVENTION

1. Field of the Invention

This invention relates to power supplies and, more particularly, to ringing signal power supplies suitable for telephone networks.

2. Description of the Prior Art

Telephone switching systems require the ringing signals emanating from the central office to comprise a DC voltage on which there is superimposed a 20 Hz AC voltage whose magnitude is larger than the magnitude of the DC voltage. These ringing signals are generally obtained by superimposing the regulated output of a 20 Hz ringing inverter or generator on the central office DC battery. The DC voltage control is obtained by inserting in series with the battery a string of varistor diodes (of appropriate number) which serve as voltage reducing elements. To insure that only the DC voltage is reduced by the diode string, the string is bypassed with a large capacitor. Although the prior art regulation method yields a simple and reliable circuit, the resulting DC regulation is poor. Tighter regulation is highly desirable, in order to avoid both failure to trip the ring relay in the central office—in long subscriber loops, and false tripping—in short subscriber loops. In the No. 1 ESS network, the required ringing signal is 86 volts AC superimposed on $39\pm1.0$ volts DC. Such tight voltage regulation cannot be obtained by employing the diode string voltage reducing method.

In the voltage regulation art, it is well known that DC voltages can be regulated with series or shunt DC regulators. These regulators, however, develop only DC output voltages and, when designed for positive sources, cannot respond to AC sources that are negative at any time.

It is an objective of this invention to employ the teachings of the regulator art and to develop therewith a ringing voltage generator that would be capable of handling source voltages that vary between negative and positive potentials, that would provide the desired DC voltage with the superimposed AC voltage, and that would do so without the use of power conveying transformers.

SUMMARY OF THE INVENTION

In telephone switching networks, it is required to develop ringing signals in the central office that comprise an AC voltage combined with one of a number of precise DC voltages smaller in magnitude than the AC voltage, the choice of which is related to the distance of the customer's terminal from the central office. In the past, the different required DC voltages have been obtained by the use of dropping diodes in series with the DC supply of the central office. For some electronic switching systems, however, the regulation furnished by the diodes is insufficient.

This invention realizes superior regulation of the DC component in the desired ringing signal by developing, at low power levels, the appropriate DC voltage from the central office's DC supply, by combining the developed DC voltage with a replica of the office's AC source and by applying the combined signal to the control terminal of a regulator which develops the desired ringing signal from the office's DC supply superimposed on the office's AC source.

DETAILED DESCRIPTION

Figure 1:
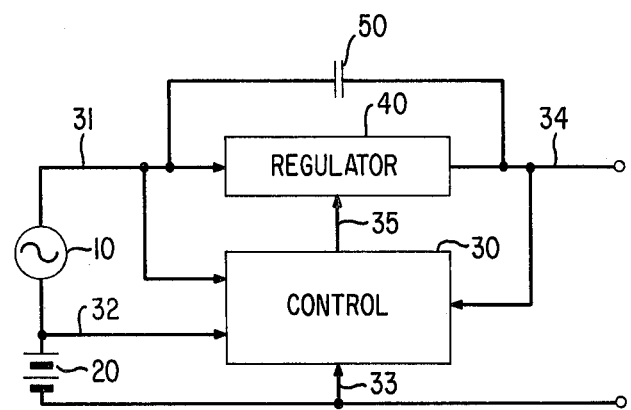
FIG. 1 illustrates the basic power supply arrangement of this invention.

FIG. 1 illustrates the basic structure of a power supply, in accordance with the principles of this invention, for developing a ringing voltage comprising a DC voltage with a superimposed AC voltage. The power source employed is AC voltage generator 10 serially connected to DC voltage generator 20; and this power source is applied through lead 31 to the input terminal of voltage regulator element 40. Regulator 40 has an input terminal to which lead 31 is connected, an output terminal to which lead 34 is connected, and a control terminal to which lead 35 is connected. A capacitor, 50, which carries the AC current flowing through a load connected between lead 34 and ground, is connected between leads 31 and 34. The signal on lead 35 is obtained from control element 30 which is responsive to the DC voltage of generator 20 (across leads 32 and 33), to the AC voltage of generator 10 (across leads 31 and 32), and optionally, to the power supply output voltage (across leads 34 and 33). The control voltage developed by element 30 and applied on lead 35 is adapted for generating the desired DC voltage levels with the applied AC voltage at the power supply's output.

Figure 3:
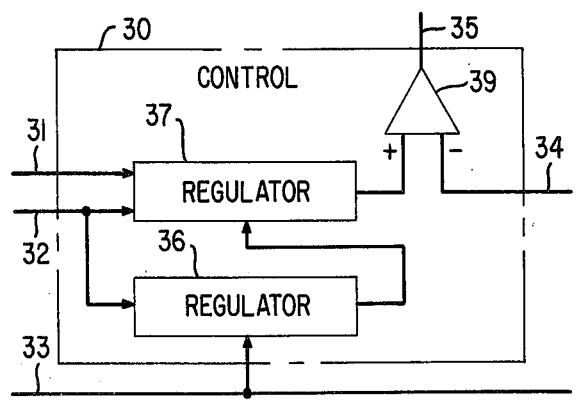
FIGS. 3 and 4 depict two implementations of control element 30 employing feedback.
Figure 4:
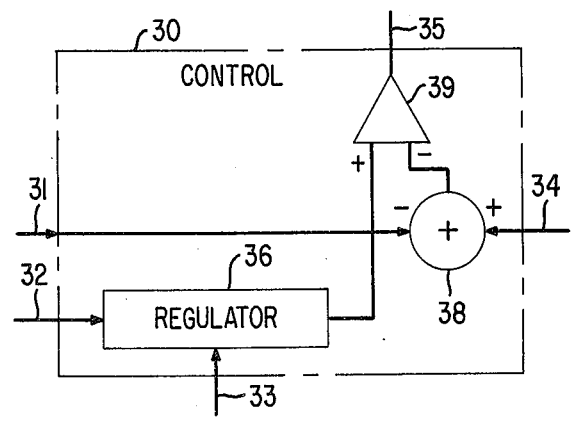

Since the AC portion of the ringing voltage is of a low frequency (i.e., 20 Hz), it is important, if low cost and small size are to be maintained, not to have transformers which carry load currents present in regulator 40. Consistent with this philosophy, control element 30 may be implemented in a feedbackless manner, as shown in FIG. 2, or through the use of feedback, as shown in FIGS. 3 and 4.

Figure 2:
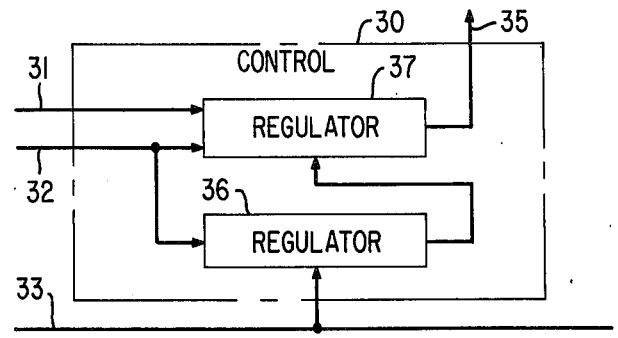
FIG. 2 shows a feedbackless implementation of control element 30 of FIG. 1.

In FIG. 2, the desired DC voltage component of the control voltage is developed in element 36 from the DC voltage of generator 20 (leads 32-33), and the desired AC voltage component of the control voltage is developed in element 37 from the AC voltage of generator 10 (leads 31-32). The DC voltage developed by element 36 is slightly higher than the DC voltage desired at the power supply's output because of the expected DC voltage drop between the control terminal and the output terminal of regulator 40. This voltage drop in regulator 40 must be accounted for only in feedbackless realizations of control element 30. The developed AC voltage component of element 37 is added to the developed DC voltage of element 36 to form the control voltage of lead 35.

Figure 5:
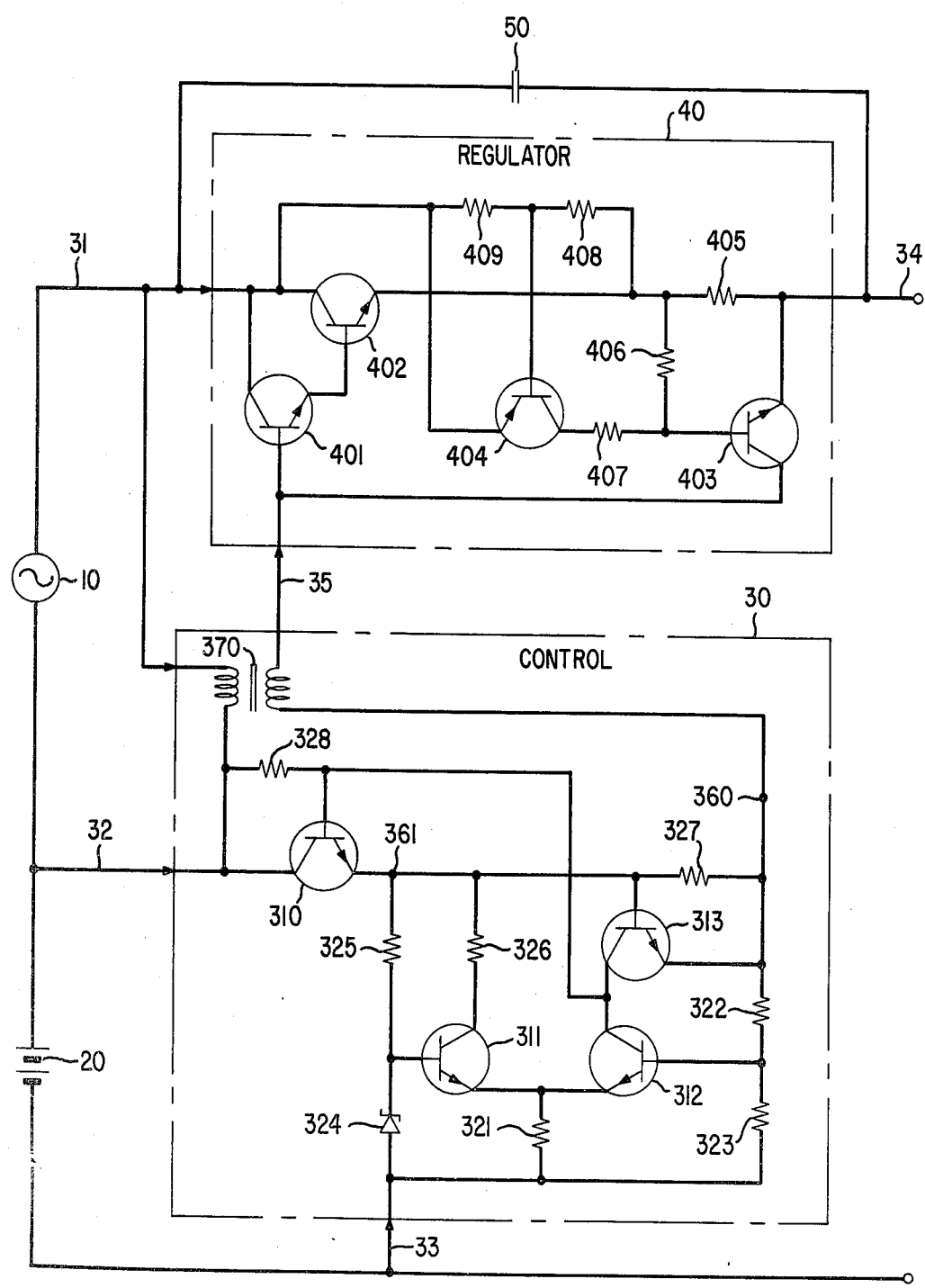
FIG. 5 shows a detailed schematic diagram of a feedbackless power supply in accordance with the principles of this invention, as depicted in FIGS. 1 and 2.

Regulator 36 may be a conventional regulator. A detailed schematic diagram of one such regulator is shown in FIG. 5 and described infra. Regulator 37 may, most conveniently, be a transformer.

The network of FIG. 2 develops a control voltage on lead 35 but it provides no measure of the actual and true voltage developed by the power supply at output leads 34-33. In applications where very tight control of the output voltage is not absolutely necessary, the configuration of FIG. 2 may suffice. In applications where very tight control over the output voltage is desired, a feedback approach where a measure of the output voltage aids in developing the appropriate control signal is preferable. FIGS. 3 and 4 depict two such feedback configurations which are suitable for the purposes of this invention.

In FIG. 3, the control voltage developed by the circuit of FIG. 2 is compared to the output voltage of lead 34 by applying the output voltage of the FIG. 2 circuit to the positive input of differential amplifier 39 and by applying lead 34 to the negative input of amplifier 39. The resulting output voltage of amplifier 39 is the amplified error voltage which controls regulator 40, which indeed turns out to be the desired AC voltage superimposed on the desired DC voltage plus the DC voltage drop between the control and output terminals of regulator 40.

In FIG. 4, the desired AC voltage is subtracted in element 38 from the output voltage developed on lead 34, and the difference output voltage of element 38 is applied to the negative input of differential amplifier 39. The positive input of differential amplifier 39 is connected to a DC reference voltage which is developed in regulator 36 from the DC supply voltage of generator 20. It should be noted that the DC reference voltage developed by regulator 36 in the FIGS. 3 and 4 embodiments should, unlike in the FIG. 2 embodiment, be equal to the desired DC voltage at the output of the power supply. Subtractor 38 may be realized by interposing an appropriately phased secondary winding of a transformer between lead 34 and the negative input of amplifier 39, with the primary winding of the transformer being connected to leads 31-32.

FIG. 5 illustrates a detailed schematic diagram of a power supply, in accordance with the principles of this invention, which employs the regulator control element configurations depicted in FIGS. 1 and 2. Therein, element 30 is shown to include a transformer 370 serving the function of element 37 and a DC reference regulator serving the function of regulator 36, comprising transistors 310-313 and associated circuitry. Transformer 370 has its primary winding connected across AC generator 10 and its secondary winding connected between the control terminal of regulator 40 and the output port of the reference regulator, at terminal 360. In the reference regulator, resistor 321 has one of its leads connected to the emitters of transistors 311 and 312 and its other lead connected to the reference potential of lead 33. The base of transistor 312 is driven from a voltage division network having resistor 322 connected between terminal 360 and the base of transistor 312 and resistor 323 connected between the base of transistor 312 and lead 33. The voltage at the base of transistor 312 is directly proportional to the output voltage, at terminal 360, of the reference regulator.

The base voltage of transistor 312 is effectively compared to the base voltage of transistor 311. The base voltage of transistor 311 is determined by the breakdown voltage of zener diode 324 which is connected between the base of transistor 311 and lead 33. Zener diode 324 is maintained in its breakdown region by the current through resistor 325 which is connected between the base of transistor 311 and the potential of terminal 361, to which the base of transistor 313 and the emitter of transistor 310 are connected. Resistor 326 is connected between terminal 361 and the collector of transistor 311, and resistor 327 is connected between terminals 361 and 360. The emitter of transistor 313 is also connected to terminal 360, while the collector of transistor 313 is connected to the collector of transistor 312, to the base of transistor 310, and to one lead of resistor 328. The other lead of resistor 328 is connected to the collector of transistor 310 and to lead 32 which emanates from DC voltage generator 20.

The reference voltage regulator works in the following manner. The DC voltage across terminal 360 is sensed by the divider network of resistors 322 and 323 and applied to the base of transistor 312. The voltage at the base of transistor 312 is nominally the same as the voltage at the base of transistor 311 and both transistors 311 and 312 are conducting. Current is drawn by transistor 312 from resistor 328, and the voltage on the collector of transistor 312 drops in accordance with the drawn current. The voltage at the collector of transistor 312 is also the voltage at the base of transistor 310. That voltage is arranged to be essentially equal to the desired voltage at terminal 360. Resistor 327 and transistor 313 form a current limiting network. Resistor 327 is of an appropriately small value, causing transistor 313 to be "off" under normal operating conditions and causing the voltage at terminal 361 to be only slightly higher than the voltage at terminal 360.

When, for some reason, the voltage at terminal 360 increases above the desired level, the base of transistor 312 also rises, causing a greater current flow through its collector. The greater collector current flow reduces the collector voltage of transistor 312 and the base voltage of transistor 310. Correspondingly, the voltage at terminals 361 and 360 is reduced. A similar situation occurs when the voltage of terminal 360 drops for some reason. At such a happenstance, the base voltage of transistor 312 also drops, the collector current of transistor 312 drops correspondingly, the collector voltage of transistor 312 rises, the base voltage of transistor 310 rises, and the potential of terminal 360 also rises.

If the current drawn by the load connected to terminal 360 is increased, the voltage across resistor 327 is also increased. When that voltage rises above the voltage necessary to turn "on" transistor 313, current is drawn away from the base of transistor 310 by the collector current flow of the "turned on" transistor 313. This tends to reduce the voltage at the base of transistor 310 in spite of the reduced collector current of transistor 312, reducing thereby the voltage at terminal 360. From the above analysis it can be observed that the current capable of being drawn out of terminal 360 is limited essentially to the current that would cause resistor 327 to impress a "turn on" voltage across the base emitter junction of transistor 313.

Since one lead of the secondary winding of transformer 370 is connected to terminal 360, the voltage at the second lead of the transformer's secondary winding corresponds to the sum of the AC voltage developed by the secondary winding and the DC voltage developed by the reference regulator. This sum voltage is applied, as shown in FIG. 5, to the control terminal of regulator 40.

Regulator 40 is depicted in FIG. 5 as a series regulator having a regulation section and a current-foldback section. The regulation section comprises a Darlington arrangement of transistors 401 and 402, with the collectors of transistors 401 and 402 being connected to the input terminal of regulator 40, the base of transistor 401 being connected to the control terminal of regulator 40, and the emitter of transistor 401 being connected to the base of transistor 402. The current foldback section, which maintains the power dissipated in transistors 401 and 402 essentially constant during current limiting, comprises transistors 403 and 404 and resistors 405-409. Resistors 408 and 409 are serially connected between the collector and emitter terminals of transistor 402. The base of transistor 404 is connected to the junction of resistors 408 and 409, while the emitter of transistor 404 is connected to the collector of transistor 402. The emitter of transistor 402 is connected to the output terminal of regulator 40 through resistor 405, the collector of transistor 404 is connected to the base of transistor 403 through resistor 407, the emitter of transistor 403 is connected to the output terminal of regulator 40, and the collector of transistor 403 is connected to the base of transistor 401. Resistor 406 is connected between the base of transistor 403 and the emitter of transistor 402, and finally, capacitor 50 is connected between the input and output terminals of regulator 40.

Under normal conditions, the voltage at the base of transistor 401 is high and the collector-to-emitter voltage of transistor 402 is such that the base-emitter voltage is below the "turn on" potential of transistor 404. Transistor 404, therefore, is "off". Also, the current flowing through transistor 402 and resistor 405 is below design maximum and the voltage developed across resistor 405 (which is fully impressed across the base emitter junction of transistor 403 since no current flows through resistor 406) is below the "turn on" voltage of transistor 403.

When the load across leads 34-33 is increased and a current overload condition occurs, the voltage across resistor 405 is increased to the point of turning transistor 403 "on" and current is drawn from the output of control element 30 to the point where the reference regulator enters its current-limited mode of operation. When this occurs, the DC voltage at terminal 360 and the base of transistor 401 drops, and consequently, the emitter voltage of transistor 402 drops. This results in an increased voltage between the collector and emitter terminals of transistor 402 and in an increased voltage across the base-emitter junction of transistor 404. When the base-emitter voltage of transistor 404 increases to the point of turning transistor 404 "on", current flows from the collector of transistor 404 to the output terminal of regulator 40 through resistors 407, 406, and 405. This current flow increases the "turn on" potential of transistor 403 by the potential developed across resistor 406 and by the increase in the potential developed across resistor 405. Resistor 406 is much larger than resistor 405 and therefore the bulk of the voltage increase results from the increase in voltage across resistor 406. Since transistor 403 is already "on" and its base-emitter junction forms a voltage source, the voltage rise across resistor 406 must be offset by a corresponding voltage drop across resistor 405 which, in turn, corresponds to a lower load current. In the limit, the voltage at terminal 360 is close to zero, transistors 401 and 402 are "off", and the load current essentially flows only through transistor 403. This load current is the maximum output current of the reference regulator of element 30.

What is claimed is:

1. A power supply responsive to an input AC voltage superimposed on an input DC voltage for developing an output voltage having said AC voltage superimposed on a regulated DC voltage characterized by:

control means responsive to said input AC voltage superimposed on said input DC voltage for developing a control signal essentially equal to said output voltage;

regulator means having an input terminal responsive to said input AC voltage superimposed on said input DC voltage, a control terminal responsive to said control means and an output terminal for developing said output voltage; and a capacitor connected between said input terminal and said output terminal of said regulator means.

2. A power supply in accordance with claim 1 wherein said control means comprises:

another regulator means, responsive to said input DC voltage, for developing a replica of said regulated DC voltage;

means for adding said AC voltage to said replica of said regulated DC voltage to develop thereby a replica of said output voltage; and differential amplifier means having its inverting input responsive to said output voltage, its noninverting input responsive to said replica of said output voltage, and its output connected to said control terminal of said regulator.

3. A power supply in accordance with claim 1 wherein said control means comprises:

means for subtracting said AC voltage from said output voltage;

means for modifying said input DC voltage to develop a replica of said regulated DC voltage; and differential amplifier means having its inverting input responsive to the output signal of said means for subtracting, its noninverting input responsive to said replica of said regulated DC voltage and its output connected to said control terminal of said regulator.

4. A power supply having a supply voltage comprising an input AC voltage superimposed on an input DC voltage, for developing a regulated output voltage having a first AC voltage substantially equal to said input AC voltage superimposed on a first regulated DC voltage characterized by:

a regulator having an input terminal responsive to said supply voltage, an output terminal for developing said regulated output voltage and a control terminal;

a capacitor connected between said input terminal of said regulator and said output terminal of said regulator;

means for developing a second AC voltage substantially equal to the desired said first AC voltage;

means for developing a second regulated DC voltage slightly larger than the desired said first regulated DC voltage; and means for applying to said control terminal a sum signal composed of said second AC voltage and said second regulated DC voltage.

5. A power supply in accordance with claim 4 wherein said regulator is a series regulator and wherein said second regulated DC voltage is larger then said first regulated DC voltage by the characteristic DC voltage drop between said control terminal and said output terminal.

6. The power supply of claim 4 wherein said means for developing a second AC voltage is a one-to-one transformer.

7. The power supply of claim 4 wherein said regulator includes means for current foldback.

* * * * *